United States Patent
Agrawal et al.

(10) Patent No.: US 12,333,205 B2
(45) Date of Patent: Jun. 17, 2025

(54) DISPLAY CONFIGURATION DETERMINATION FOR CONNECTED DISPLAY DEVICES

(71) Applicant: MOTOROLA MOBILITY LLC, Wilmington, DE (US)

(72) Inventors: Amit Kumar Agrawal, Bangalore (IN); Igor Kovalenko, Palatine, IL (US); Prashanth Chakravarthy, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/501,921

(22) Filed: Nov. 3, 2023

(65) Prior Publication Data

US 2025/0147711 A1    May 8, 2025

(51) Int. Cl.
*G06F 3/14*       (2006.01)
*G06F 3/147*      (2006.01)

(52) U.S. Cl.
CPC ............ *G06F 3/1454* (2013.01); *G06F 3/147* (2013.01)

(58) Field of Classification Search
None
See application file for complete search history.

(56) References Cited

U.S. PATENT DOCUMENTS

| | | | |
|---|---|---|---|
| 2013/0328878 A1* | 12/2013 | Stahl | G09G 5/005 345/1.3 |
| 2023/0229375 A1* | 7/2023 | Niu | G06F 3/1423 345/589 |
| 2024/0205498 A1* | 6/2024 | Lu | H04N 21/4858 |

* cited by examiner

*Primary Examiner* — Andre L Matthews
(74) *Attorney, Agent, or Firm* — Isidore PLLC

(57) ABSTRACT

A method provides techniques for display configuration determination for connected display devices. The method includes connecting, by a processor of an electronic device, to an external display. The method further includes determining a display size for the external display, and determining a display category for the external display, based at least in part, on the display size. The method further includes configuring, based on the display category, content presented for consumption via the display, where at least one display characteristic of the content can be modified for optimal presentation on the display.

17 Claims, 8 Drawing Sheets

DISPLAY CONFIGURATION DETERMINATION FOR CONNECTED DISPLAY DEVICES

BACKGROUND

1. Technical Field

The present disclosure generally relates to portable electronic devices, and more specifically to portable electronic devices that support connecting to external display devices.

2. Description of the Related Art

Modern portable electronic devices, such as smartphones and tablet computers, can provide a myriad of features. These features can include communication features, such as sending text messages and making voice calls and video and image capturing features utilizing integrated digital cameras. Modern portable electronic devices can also be used for many types of activities. The activities can include entertainment activities, such as watching television programs, movies, and videos, and other content, such as from social media sites. The activities can include productivity activities, which can include using applications such as word processors, spreadsheet programs, graphic design programs, and so on. The activities can include gaming activities, which can include playing video games such as puzzle games, sports and racing games, role-playing games, and simulation games, to name a few. These portable electronic devices are equipped with high-resolution displays providing the user interface for engaging with these activities and features. Viewing and engaging with these activities can often be enhanced through a connection to a larger external display.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
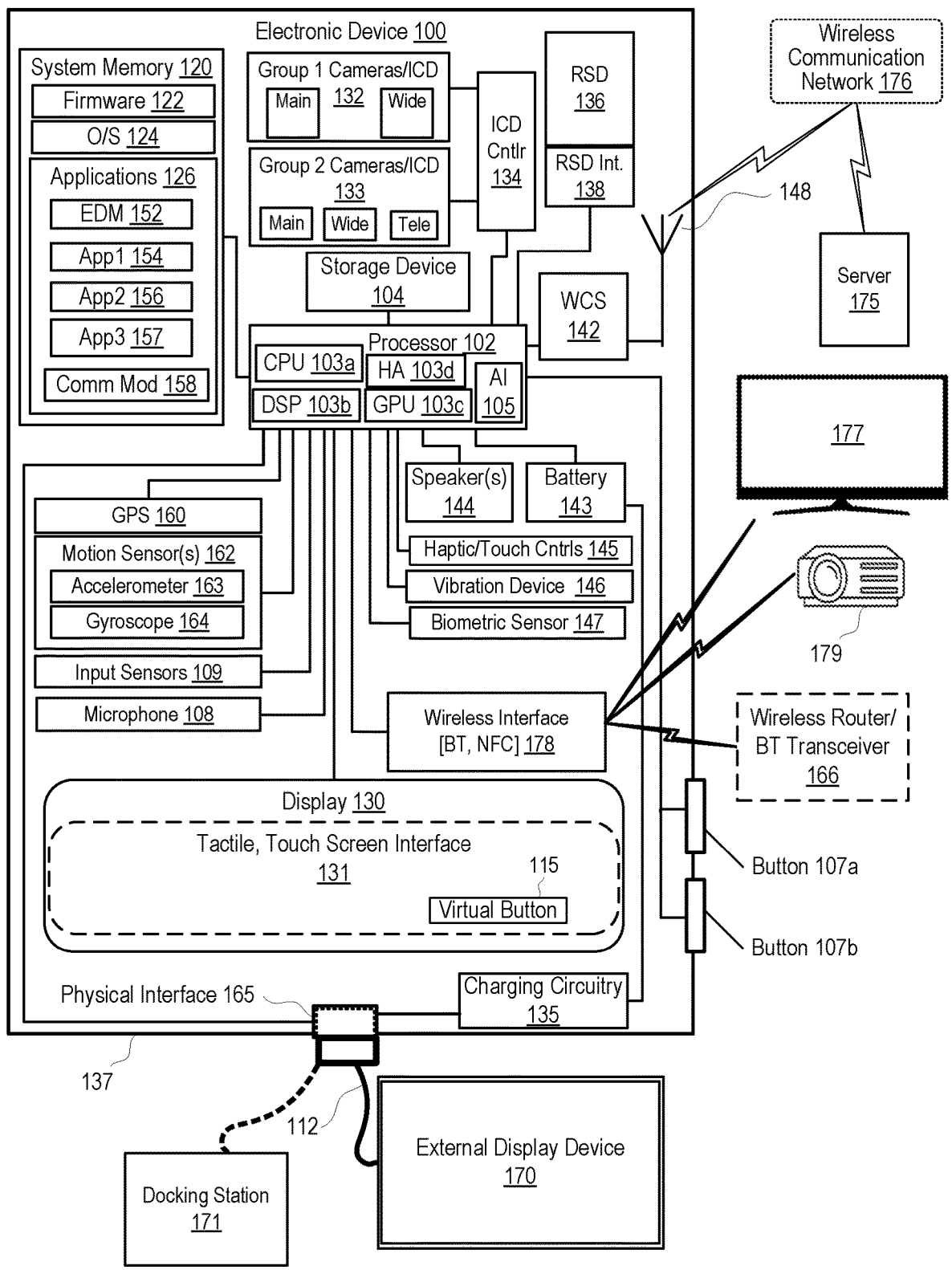
FIG. 1 depicts an example component makeup of a communication device with specific components used to enable the device to perform functions of determining display configuration for connected display devices, according to one or more embodiments.

According to aspects of the present disclosure, an electronic device, a method, and a computer program product provides techniques for determining display configurations for connected display devices. One or more embodiments can include connecting, by a processor of an electronic device, to an external display; determining a display size for the external display; determining a display category for the external display, based at least in part, on the display size; and configuring, based on the display category, content presented for consumption via the external display, where at least one display characteristic of the content can be modified for optimal presentation on the display.

Many portable electronic devices such as smartphones and tablets are powerful devices that can render high-definition video content, gaming content. These devices are also powerful enough to run productivity application such as word processors and spreadsheets. As these devices often have smaller displays, to enable portability, it is often desirable to connect portable electronic devices to an external display when feasible, to obtain an improved user experience. However, challenges exist when utilizing an external display. Televisions and monitors can come in various sizes and resolutions, making it difficult to render a consistent user experience across different external displays. In some instances, graphical elements such as icons and text can be rendered smaller than an optimal size on large displays such as televisions. Conversely, graphical elements such as icons and text can be rendered larger than an optimal size on some computer monitors. In particular, displays in a mid-size range (e.g., 13 inch-to 44 inch diagonally measured) can conveniently be used in an "applications" usage mode. In the "applications" usage mode, the user may be located one to two feet from the display surface, for using productivity applications such as word processors, spreadsheets, drawing programs, and the like. Additionally, the mid-size range displays can also conveniently be used in an "entertainment" (video) usage mode. In the entertainment usage mode, the user may be located six to ten feet from the display surface. Accordingly, in the "entertainment" usage mode, the user may be located at a greater viewing distance than when in an applications usage mode. The different usage modes can impact the optimal configuration for graphical elements such as program/application icons, text, and/or other graphical elements. As an example, when located two feet or less from a display surface, it may make sense to display a certain number of icons at a given size. However, when located six to ten feet from the same display, the rendered icons may be too small to easily view. Similarly, presenting larger graphical elements may be optimal when the viewing distance is greater, but the graphical elements can appear to be oversized when viewed from a distance of two feet or less.

The disclosed embodiments alleviate the aforementioned issues by considering various factors, including display size, display category, and usage mode. In one or more embodiments, a user may specify a usage mode, such as an entertainment mode, an applications mode, or a gaming mode. Based on the usage mode, along with a display size, resolution, and/or other parameters of an attached external display, a display category can be inferred, along with a viewing distance. Based on the aforementioned parameters, the disclosed embodiments can configure content presented for consumption via the external display. The configuring of content can include selecting a size and/or resolution of graphical elements, such as text and/or application (app) icons to display on the external display. The configuration of content can include determining a number of rows and/or columns of application icons to display on the external display. In this way, disclosed embodiments can provide an optimal user experience when content from a portable electronic device is displayed on an external display device.

One or more embodiments can include an electronic device including: a memory having stored thereon, a display configuration module; a communication subsystem that includes an interface by which the electronic device communicatively connects to one or more display devices; and a processor communicatively coupled to the memory and communication subsystem, and which executes program code of the display configuration module, which causes the electronic device to: connect, via the interface, to an external display; determine a display size for the external display; determine a display category for the external display, based at least in part, on the display size; and configure, based on the display category, content presented for consumption via the external display, where at least one display characteristic of the content can be modified for optimal presentation on the display.

The above descriptions contain simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Each of the above and below described features and functions of the various different aspects, which are presented as operations performed by the processor(s) of the communication/electronic devices are also described as features and functions provided by a plurality of corresponding methods and computer program products, within the various different embodiments presented herein. In the embodiments presented as computer program products, the computer program product includes a non-transitory computer readable storage device having program instructions or code stored thereon, which enables the electronic device and/or host electronic device to complete the functionality of a respective one of the above-described processes when the program instructions or code are processed by at least one processor of the corresponding electronic/communication device, such as is described above.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one implementation (embodiment) of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not for other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element (e.g., a person or a device) from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Throughout this disclosure, the terms 'electronic device', 'communication device', and 'electronic communication device' may be used interchangeably, and may refer to devices such as smartphones, tablet computers, and/or other computing/communication devices.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Referring now to the figures and beginning with FIG. 1, there is illustrated an example component makeup of electronic device 100, within which various aspects of the disclosure can be implemented, according to one or more embodiments. Examples of electronic device 100 include, but are not limited to, mobile devices, a notebook computer, a mobile phone, a smart phone, a digital camera with enhanced processing capabilities, a smart watch, a tablet computer, and other types of electronic device. It is appreciated that electronic device 100 can include other types of electronic devices that are capable of providing display configuration determination for connected display devices.

Electronic device 100 includes processor 102 (typically as a part of a processor integrated circuit (IC) chip), which includes processor resources such as central processing unit (CPU) 103a, communication signal processing resources such as digital signal processor (DSP) 103b, graphics processing unit (GPU) 103c, and hardware acceleration (HA) unit 103d. In some embodiments, the hardware acceleration (HA) unit 103d may establish direct memory access (DMA) sessions to route network traffic to various elements within electronic device 100 without direct involvement from processor 102 and/or operating system 124. Processor 102 can interchangeably be referred to as controller 102.

Controller 102 can, in some embodiments, include image signal processors (ISPs) (not shown) and dedicated artificial intelligence (AI) engines 105. Controller 102 is communicatively coupled to storage device 104, system memory 120, input devices (introduced below), output devices, including integrated display 130, and image capture device (ICD) controller 134.

ICD controller 134 can perform image acquisition functions in response to commands received from processor 102 in order to control group 1 ICDs 132 and group 2 ICDs 133 to capture video or still images of a local scene within a FOV of the operating/active ICD. In one or more embodiments, group 1 ICDs can be front-facing, and group 2 ICDs can be rear-facing, or vice versa. Throughout the disclosure, the term image capturing device (ICD) is utilized interchangeably to be synonymous with and/or refer to any one of the cameras 132, 133. Both sets of cameras 132, 133 include image sensors that can capture images that are within the field of view (FOV) of the respective camera 132, 133.

In one or more embodiments, the functionality of ICD controller 134 is incorporated within processor 102, eliminating the need for a separate ICD controller. Thus, for simplicity in describing the features presented herein, the various camera selection, activation, and configuration functions performed by the ICD controller 134 are described as being provided generally by processor 102. Similarly, manipulation of captured images and videos are typically performed by GPU 103c and certain aspects of device communication via wireless networks are performed by DSP 103b, with support from CPU 103a. However, for simplicity in describing the features of the disclosure, the functionality provided by one or more of CPU 103a, DSP 103b, GPU 103c, and ICD controller 134 are collectively described as being performed by processor 102. Collectively, components integrated within processor 102 support computing, classifying, processing, transmitting and receiving of data and information, and presenting of graphical images within a display.

System memory 120 may be a combination of volatile and non-volatile memory, such as random-access memory (RAM) and read-only memory (ROM). System memory 120 can store program code or similar data associated with firmware 122, an operating system 124, and/or applications 126. During device operation, processor 102 processes program code of the various applications, modules, OS, and firmware, that are stored in system memory 120.

In accordance with one or more embodiments, applications 126 include, without limitation, external display module (EDM) 152, other applications, indicated as 154, 156 and 157, and communication module 158. Each module and/or application provides program instructions/code that are processed by processor 102 to cause processor 102 and/or other components of electronic device 100 to perform specific operations, as described herein. Descriptive names assigned to these modules add no functionality and are provided solely to identify the underlying features performed by processing the different modules. For example, external display module 152 includes program instructions for determining display configuration for connected external display devices.

In one or more embodiments, electronic device 100 includes removable storage device (RSD) 136, which is inserted into RSD interface 138 that is communicatively coupled via system interlink to processor 102. In one or more embodiments, RSD 136 is a non-transitory computer program product or computer readable storage device encoded with program code and corresponding data, and RSD 136 can be interchangeably referred to as a non-transitory computer program product. RSD 136 may have a version of one or more of the applications (e.g., 152, 154, 156, 158) and specifically external display module 152 stored thereon. Processor 102 can access RSD 136 to provision electronic device 100 with program code that, when executed/processed by processor 102, the program code causes or configures processor 102 and/or generally electronic device 100, to provide the various display configuration functions described herein.

Electronic device 100 includes an integrated display 130 which incorporates a tactile, touch screen interface 131 that can receive user tactile/touch input. As a touch screen device, integrated display 130 allows a user to provide input to or to control electronic device 100 by touching features within the user interface presented on display 130. Tactile, touch screen interface 131 can be utilized as an input device. The touch screen interface 131 can include one or more virtual buttons, indicated generally as 115. In one or more embodiments, when a user applies a finger on the touch screen interface 131 in the region demarked by the virtual button 115, the touch of the region causes the processor 102 to execute code to implement a function associated with the virtual button. In some implementations, integrated display 130 is integrated into a front surface of electronic device 100 along with front ICDs, while the higher quality ICDs are located on a rear surface.

Electronic device 100 can further include microphone 108, one or more output devices such as speakers 144, and one or more input buttons, indicated as 107a and 107b. While two buttons are shown in FIG. 1, other embodiments may have more or fewer input buttons. Microphone 108 can also be referred to as an audio input device. In some embodiments, microphone 108 may be used for identifying a user via voiceprint, voice recognition, and/or other suitable techniques. Input buttons 107a and 107b may provide controls for volume, power, and ICDs 132, 133. Additionally, electronic device 100 can include input sensors 109 (e.g., sensors enabling gesture detection by a user).

Electronic device 100 further includes haptic touch controls 145, vibration device 146, fingerprint/biometric sensor 147, global positioning system (GPS) module 160, and motion sensor(s) 162. Vibration device 146 can cause electronic device 100 to vibrate or shake when activated. Vibration device 146 can be activated during an incoming call or message in order to provide an alert or notification to a user of electronic device 100. According to one aspect of the disclosure, integrated display 130, speakers 144, and vibration device 146 can generally and collectively be referred to as output devices.

Biometric sensor 147 can be used to read/receive biometric data, such as fingerprints, to identify or authenticate a user. In some embodiments, the biometric sensor 147 can supplement an ICD (camera) for user detection/identification.

GPS module 160 can provide time data and location data about the physical location of electronic device 100 using geospatial input received from GPS satellites. Motion sensor(s) 162 can include one or more accelerometers 163 and gyroscope 164. Motion sensor(s) 162 can detect movement of electronic device 100 and provide motion data to processor 102 indicating the spatial orientation and movement of electronic device 100. Accelerometers 163 measure linear acceleration of movement of electronic device 100 in multiple axes (X, Y and Z). Gyroscope 164 measures rotation or angular rotational velocity of electronic device 100. Electronic device 100 further includes a housing 137 (generally represented by the thick exterior rectangle) that contains/protects the components internal to electronic device 100.

Electronic device 100 also includes a physical interface 165. Physical interface 165 of electronic device 100 can serve as a data port and can be coupled to charging circuitry 135 and device battery 143 to enable recharging of device battery 143.

Electronic device 100 further includes wireless communication subsystem (WCS) 142, which can represent one or more front end devices (not shown) that are each coupled to one or more antennas 148. In one or more embodiments, WCS 142 can include a communication module with one or more baseband processors or digital signal processors, one or more modems, and a radio frequency (RF) front end having one or more transmitters and one or more receivers. Example communication module 158 within system memory 120 enables electronic device 100 to communicate with wireless communication network 176 and with other devices, such as server 175 and other connected devices, via one or more of data, audio, text, and video communications. Communication module 158 can support various communication sessions by electronic device 100, such as audio communication sessions, video communication sessions, text communication sessions, exchange of data, and/or a combined audio/text/video/data communication session.

WCS 142 and antennas 148 allow electronic device 100 to communicate wirelessly with wireless communication network 176 via transmissions of communication signals to and from network communication devices, such as base stations or cellular nodes, of wireless communication network 176. Wireless communication network 176 further allows electronic device 100 to wirelessly communicate with server 175, and other communication devices, which can be similarly connected to wireless communication network 176. In one or more embodiments, various functions that are being performed on communications device 100 can be supported using or completed via/on server 175.

Electronic device 100 can also wirelessly communicate, via wireless interface(s) 178, with wireless communication network 176 via communication signals transmitted by short range communication device(s) to and from an external WiFi router (or wireless transceiver device) 180, which is communicatively connected to wireless communication network 176. Wireless interface(s) 178 can be a short-range wireless communication component providing Bluetooth, near field communication (NFC), and/or wireless fidelity (Wi-Fi) connections. In one embodiment, electronic device 100 can receive Internet or Wi-Fi based calls, text messages, multimedia messages, and other notifications via wireless interface(s) 178. In one or more embodiments, electronic device 100 can communicate wirelessly with external wireless device 166, such as a WiFi router or BT transceiver, via wireless interface(s) 178. In an embodiment, WCS 142 with antenna(s) 148 and wireless interface(s) 178 collectively provide wireless communication interface(s) of electronic device 100. The device 100 of FIG. 1 is only a specific example of devices that can be used to implement the embodiments of the present disclosure. Devices that utilize aspects of the disclosed embodiments can include, but are not limited to, a smartphone, a tablet computer, a laptop computer, a desktop computer, a wearable computer, and/or other suitable electronic device.

As provided by the illustrative embodiment, communication device 100 can also include external display device 170, which is communicatively coupled to communication device 100 via a cable 112 attached to physical interface 165. External display device 170 can be one of a wide variety of display screens, monitors, or devices, such as a liquid crystal display (LCD) and an organic light emitting diode (OLED) display. In one or more embodiments, external display device 170 can be a component of a second electronic device, such as a laptop or desktop computer, that includes separate processing functionality and network connectivity. In one or more embodiments, the external display device 170 can be used as a second or an auxiliary display device to display content from the device 100 for presenting to a user of the communication device 100, and the external display device 170 can be selectively used instead of, or in addition to, the display 130 of the communication device 100. Alternatively, or additionally, an external display device may be connected wirelessly via wireless interface 178. Examples of such external display devices can include, but are not limited to, television 177 and projector 179. As an alternative to the direct connection to external display device 170 by cable 112, one or more embodiments may include a connection from the communication device 100 to a docking station 171 via cable 112, and a wired or wireless connection from the docking station 171 to an external display.

Figure 2:
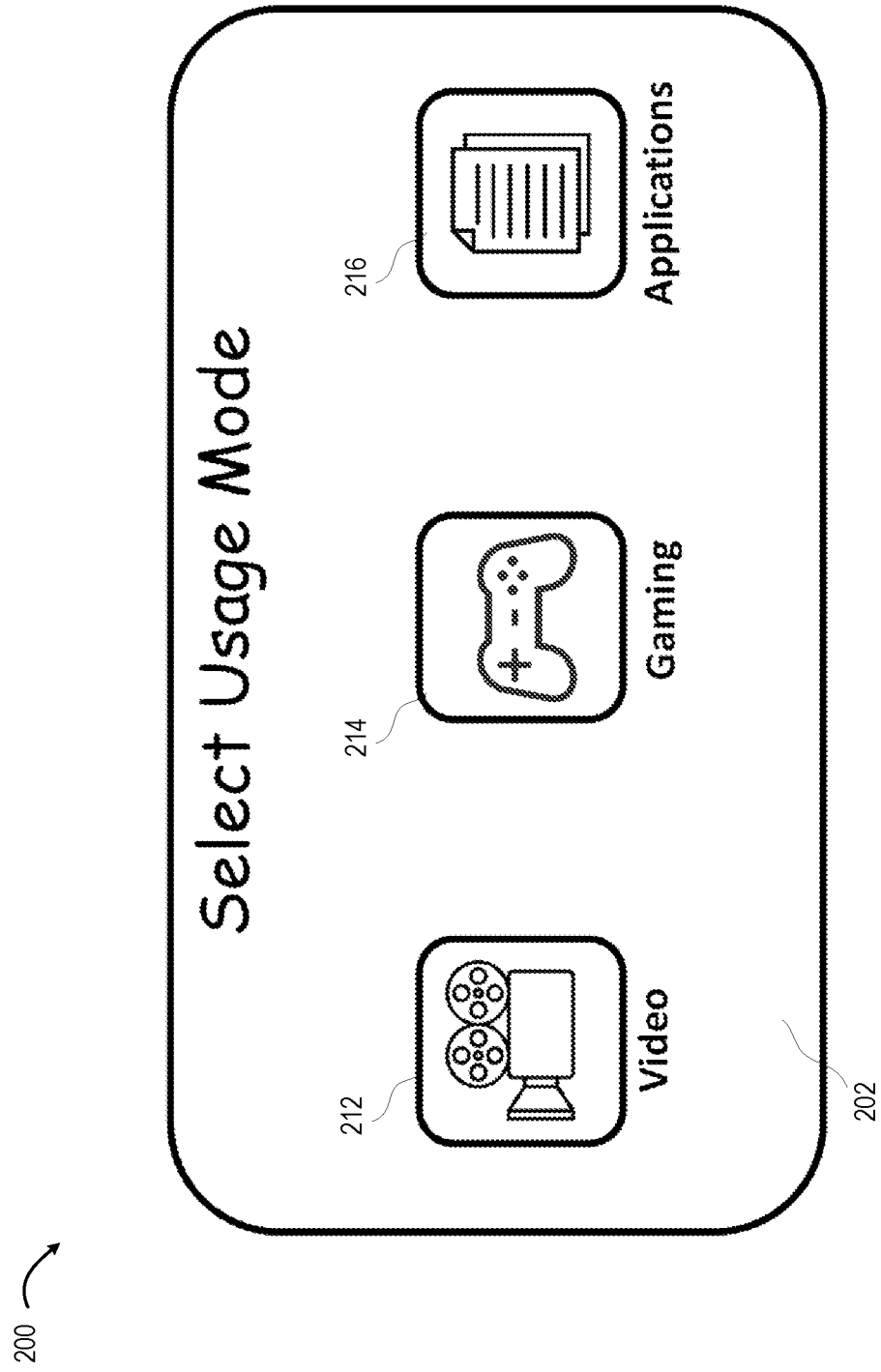
FIG. 2 illustrates a user interface for determination of a usage mode of the communication device, according to one or more embodiments.

FIG. 2 illustrates a user interface for selecting a usage mode for device operation, according to one or more embodiments. Device 200 includes a display 202 on which a usage mode selection user interface is displayed. Device 200 can be an implementation of electronic device 100, having similar components and/or functionality. In one or more embodiments, as part of a process to present content from the device 200 onto an external display (e.g., 170 of FIG. 1), a user interface such as depicted in FIG. 2 is presented. The user interface includes three buttons. Video button 212, when invoked, causes the processor of device 200 to configure the presentation of content for a video (entertainment) mode. Gaming button 214, when invoked, causes the processor of device 200 to configure the presentation of content for a gaming mode. Applications button 216, when invoked, causes the processor of device 200 to configure the presentation of content for an application (productivity) mode. In response to detecting an invocation of one of video button 212, gaming button 214, or applications button 216, the processor of device 200 determines a usage mode. One or more embodiments can include: determining a usage mode for the external display, where the usage mode includes one of gaming, video, and applications; and determining the display category based at least in part on the usage mode. One or more embodiments can include displaying the one or more graphical elements on a first display 202 of the electronic device.

Figure 3:
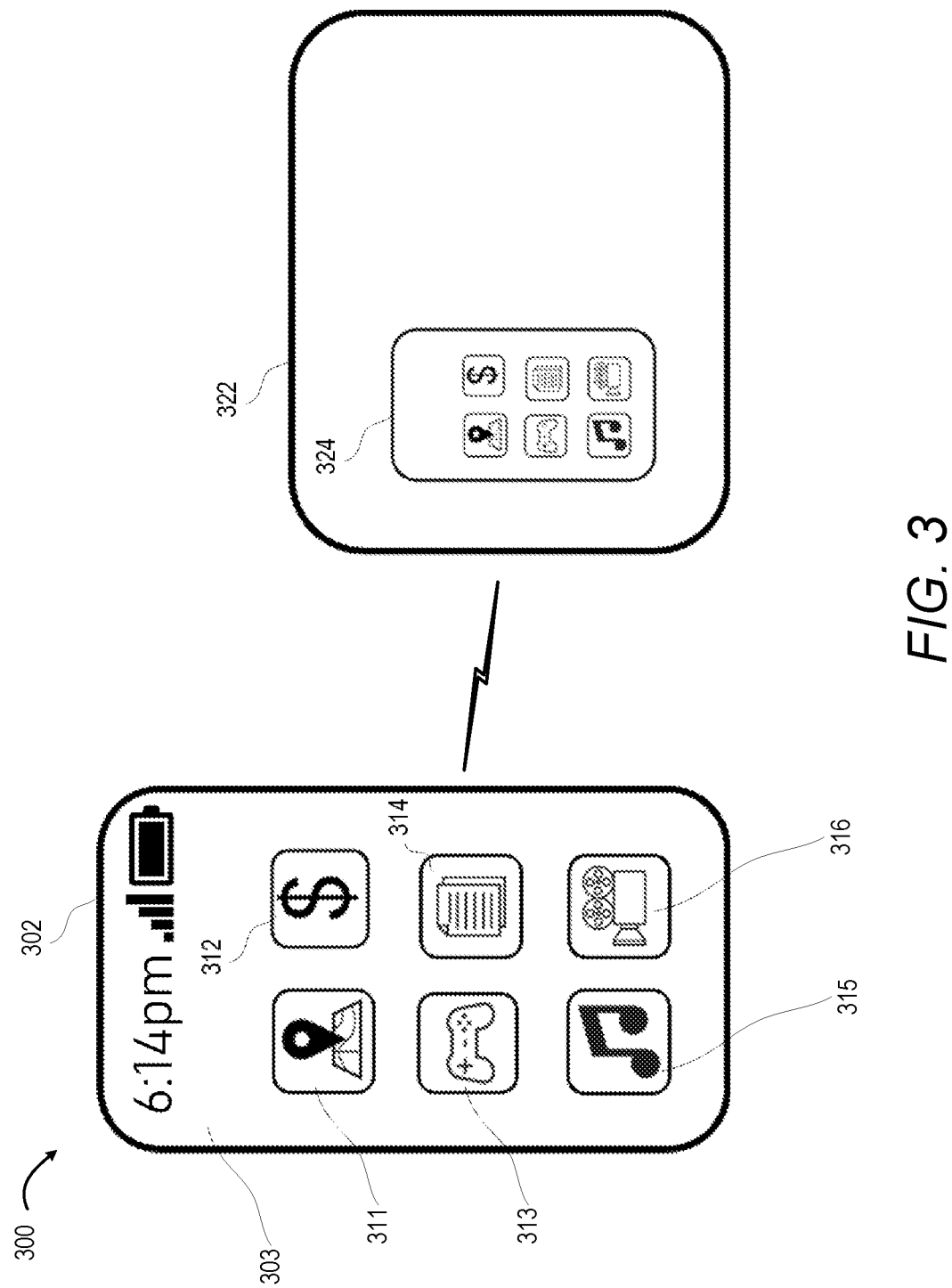
FIG. 3 illustrates an example of presenting content within an allocated subregion of an external display, according to one or more embodiments.

FIG. 3 illustrates an example 300 of presenting content from an electronic device within an allocated subregion of an external display, according to one or more embodiments. The example 300 includes a portable electronic device 302 that includes a display 303 on which multiple application icons, indicated as icons 311, 312, 313, 314, 315, and 316 are rendered. The example 300 further includes an external display 322 to which electronic device 302 is communicatively connected by a wireless connection. Note that FIG. 3 is not drawn to scale, and in practice, external display 322 can be much larger than electronic device 302. In one or more embodiments, external display 322 is communicatively connected to electronic device 302 via wireless communication. The wireless communication can include Wi-Fi, Bluetooth, and/or other suitable wireless communication technology. In one or more embodiments, the wireless communication can include Miracast. Miracast is a wireless display standard and technology that allows users to stream video and audio content from one device (such as a smartphone, tablet, laptop, or desktop computer) to another display device, such as a monitor or television, wirelessly. Miracast enables screen mirroring or screen casting, enabling the replication of content of a source device (e.g., a smartphone) on a larger external display without the need for physical cables. Miracast uses Wi-Fi Direct, a peer-to-peer Wi-Fi technology, to establish a direct wireless connection between the source device and the display device. One or more embodiments may utilize other wireless display protocols instead of, or in addition to Miracast, including, but not limited to, Google Cast.

In one or more alternate embodiments, external display 322 is communicatively connected to electronic device 302 via wired communication. The wired communication can include HDMI, USB, Ethernet, and/or other suitable wired communication technology. HDMI, or High-Definition Multimedia Interface, is a digital audio and video interface standard used to transmit high-definition video and audio signals between devices, such as televisions, monitors, gaming consoles, computers, and audio/video receivers. HDMI is a fully digital interface. It transmits data in the form of discrete digital packets or frames. HDMI supports a wide range of video resolutions, including standard definition (SD), high definition (HD), and ultra-high definition (UHD or 4K). The specific resolutions and refresh rates depend on the HDMI version and capabilities of the connected devices. HDMI can support additional features, such as HDCP, a content protection protocol, to prevent unauthorized copying or redistribution of digital content. Additionally, HDMI can support CEC (Consumer Electronics Control), a feature that allows devices connected via HDMI to control each other. For example, CEC enables a television remote to be able to control the volume on an HDMI-connected audio receiver.

As can be seen in example 300, content that is displayed on electronic device 302 is also displayed in an allocated subregion 324 of the external display 322. In embodiments, the allocated subregion 324 has the same aspect ratio as the display 303 of electronic device 302. In some embodiments, the allocated subregion 324 has a different aspect ratio than the display 303 of electronic device 302. In one or more embodiments, the processor of electronic device 302 requests a size of the allocated subregion 324 from the external display 322. In embodiments, the size and/or arrangement of graphical elements is based at least in part on the size of the allocated subregion. As an example, if external display 322 is a 32-inch (diagonally measured) display, but the allocated subregion 324 is a 6-inch (diagonally measured) area, then the processor of the electronic device 302 uses a display size of 6 inches as a criterion for configuration of content presented for consumption via the external display. Accordingly, the presentation of graphical elements can be optimized for the area allocated for the mirroring of the display 303 to the allocated subregion 324.

In one or more embodiments, the electronic device (e.g., 302 of FIG. 3) receives Extended Display Identification Data (EDID) from the external display 322 and utilized the EDID to obtain one or more properties of the external display 322. The EDID is a standardized information block that is provided by a display device, such as a television or monitor, to a connected electronic device. EDID contains various parameters and data about the display, allowing the electronic device to automatically configure its graphics settings to match the capabilities of the external display. The EDID can include manufacturer and model information that enables the electronic device to identify the make and model of the connected external display. The EDID can include the native or preferred resolution of the external display, as well as a list of other supported resolutions. The EDID information enables the electronic device to choose the best resolution for optimal display quality. Furthermore. the EDID can include information about the supported refresh rates at different resolutions for the external display 322. This helps the electronic device 302 select the appropriate refresh rate to prevent screen flickering and ensure a smooth display. In one or more embodiments, the selection of a gaming usage mode (e.g., based on user selection of gaming button 214 of FIG. 2), causes the processor to attempt to select a higher refresh rate, even if the resolution of the external display is lower, since many gaming applications work better with higher refresh rates, and are not as impacted by lower resolutions as are videos and movies. The EDID can also include the supported color depths (e.g., 8-bit, 10-bit, 12-bit) and color spaces (e.g., sRGB, Adobe RGB) that the external display can support. The EDID may further include physical size of the display (width and height) and its aspect ratio, and/or a pixel density value.

Pixel density, also known as pixels per inch (PPI) or dots per inch (DPI), measures the number of pixels within a specific physical area of a display. Pixel density is a metric that can be used to describe how many pixels are packed into one inch of screen space. In embodiments, the pixel density may be computed by dividing the diagonal resolution (in pixels) by the diagonal size (in inches) of the screen. For example, if a display has a resolution of 1920×1080 pixels and a diagonal size of 15 inches, the pixel density would be calculated as the square root of $((1920^2+1080^2)/15^2)$, resulting in approximately 147 pixels per inch (PPI). A higher pixel density means smaller pixels, which can result in a crisper and more detailed image, especially when viewed up close. The pixel density value is an important parameter for devices such as smartphones and laptops where the screen is relatively close to the viewer's eyes. In one or more embodiments, multiple sets of graphical elements may be stored on electronic device 302 and/or accessible from a server (e.g., 175 of FIG. 1). In one or more embodiments, a set of graphical elements is selected based on pixel density. As an example, with a pixel density of the external display 322 being below a predetermined threshold (e.g., 150 PPI), a low-resolution set of graphical elements is selected for display on the external display 322. Similarly, with a pixel density at or above the predetermined threshold, a high-resolution set of graphical elements is selected for display on the external display 322. Some embodiments may have multiple predetermined thresholds for pixel density, to accommodate selection of a set of graphical elements from amongst multiple sets of graphical elements of varying resolutions.

According to one aspect, the EDID information alone may not be sufficient to ensure optimal display of graphical elements under all circumstances. While the viewing distance of very small displays (e.g., 6-inch diagonal) can be inferred to be viewed up close, and very large displays (e.g., 80-inch diagonal) can be inferred to be viewed from a distance of 6 feet or more, the mid-size displays can serve in multiple usage modes. The mid-size displays can be viewed up close (2 feet or less) when used for applications such as word processors and spreadsheets, but can also be viewed from a greater distance (e.g., six feet or more) when used as a video monitor to watch a video or movie. Graphical elements that look optimal in one mode may not look optimal in another mode. Accordingly, the disclosed embodiments also take the usage mode into consideration for configuration of content presented for consumption via the external display, as illustrated in the examples shown in FIG. 4 and FIG. 5. In one or more embodiments, to determine a display size for the external display, the processor retrieves EDID information from the external display. In determining a display category for the display, the processor further determines a pixel density for the display. In one or more embodiments, the content is presented on an allocated subregion of the external display. In these embodiments, the processor further: obtains a size of the allocated subregion of the external display; and selects a specific subset of the one or more graphical elements for presentation on the display based at least in part on the obtained size of the allocated subregion and the display category.

Figure 4:
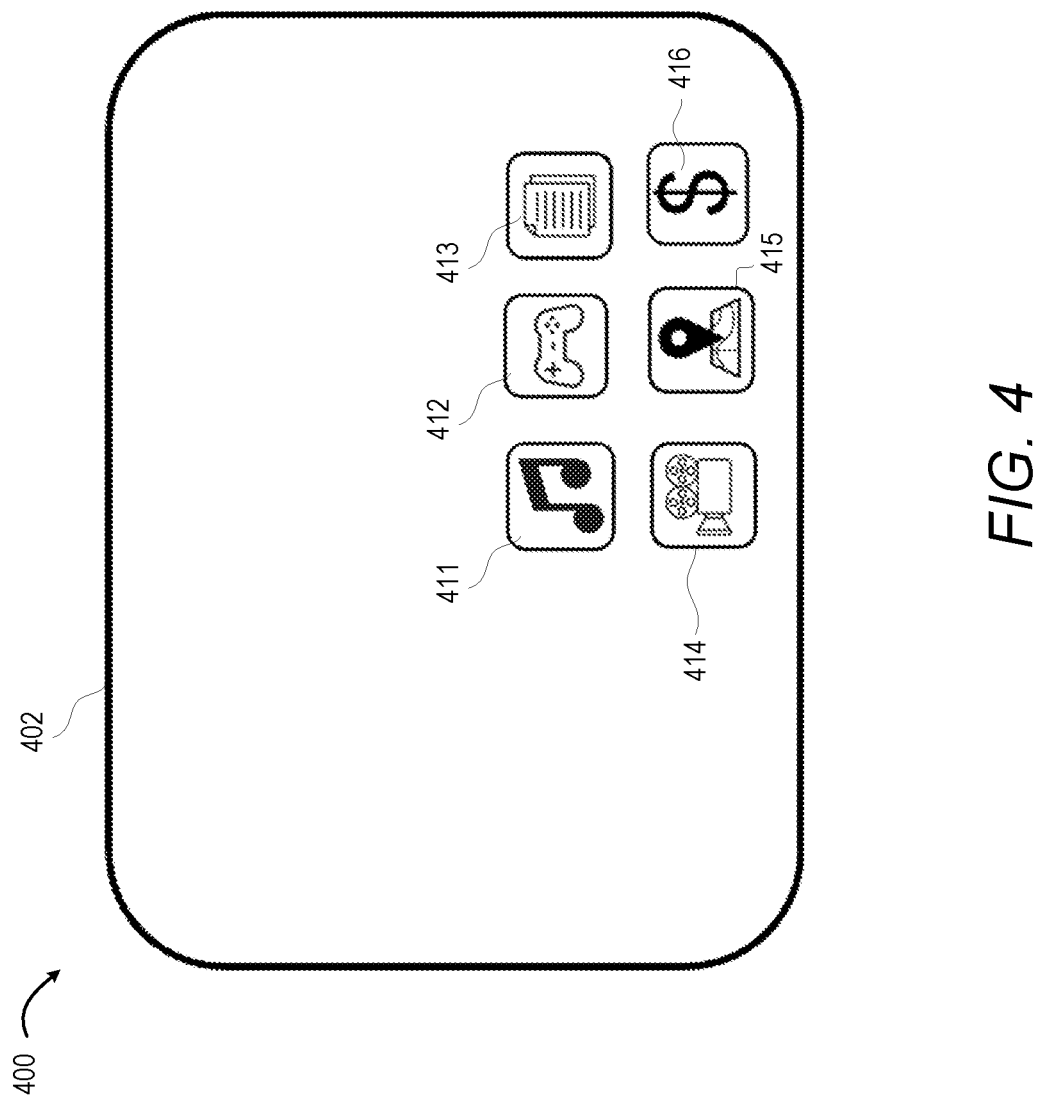
FIG. 4 illustrates rendering of graphical elements for presentation on an external display based on a usage mode, according to one or more embodiments.

FIG. 4 illustrates an example 400 of rendering of graphical elements from content from a connected electronic device for presentation on an external display 402 based on a usage mode, according to one or more embodiments. In the illustrative embodiments, the usage mode is an application mode. In one or more embodiments, prior to communicatively connecting to one or more external display devices, a usage mode may be determined, based on user input that includes invoking a mode selection button (212, 214, or 216) of FIG. 2. In embodiments, the external display 402 may be sized in the mid-size range (e.g., 13 inch—to 44 inch diagonally measured). A mid-size range monitor can be used in an applications usage mode. The user may be positioned within two feet of the external display 402. Accordingly, two rows of application icons are rendered horizontally in a small bottom section of the external display 402, as indicated by icons 411, 412, and 413 in a first row, and icons 414, 415, and 416 in a second row.

Figure 5:
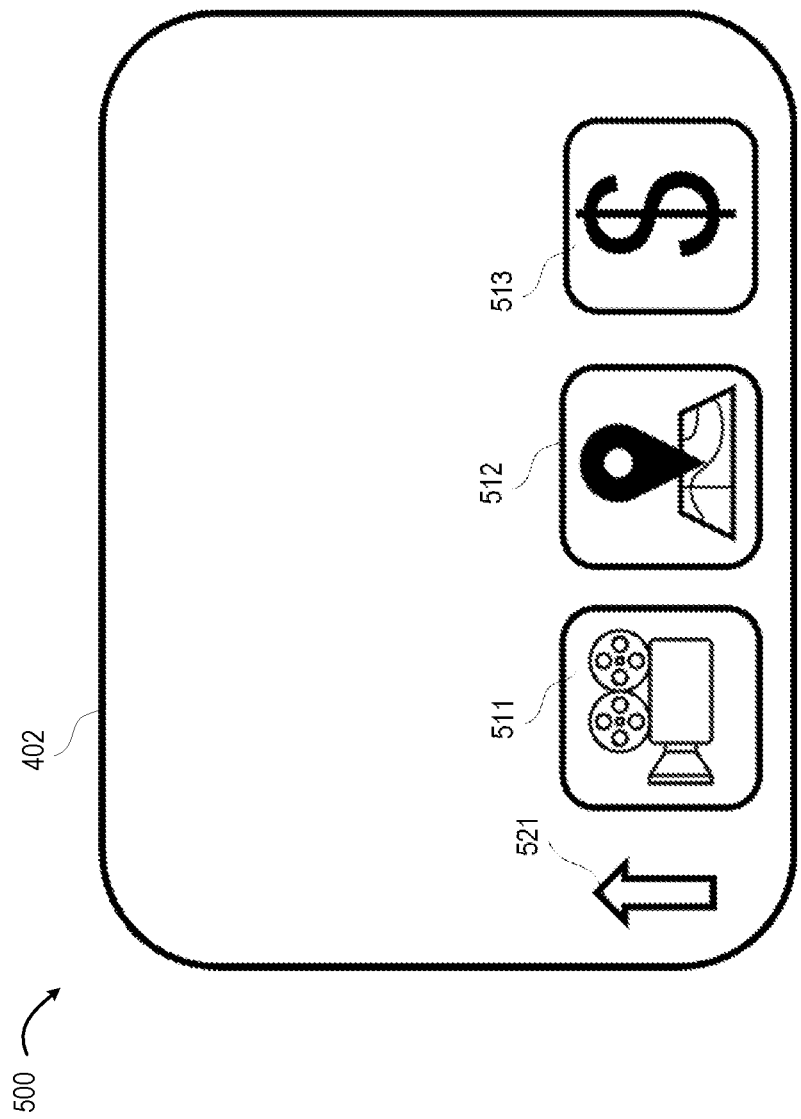
FIG. 5 illustrates rendering of graphical elements for presentation on the external display of FIG. 4, based on a different usage mode, according to one or more embodiments.

FIG. 5 illustrates an example 500 of rendering of graphical elements from content from a connected electronic device for presentation on the external display 402 of FIG. 4, based on a different usage mode, according to one or more embodiments. In the example 500, the external display 402 is configured in a video usage mode. In the video usage mode, content presented for consumption via the external display 402 can be configured for optimal viewing from a distance of six to ten feet away. While people may prefer to be close (2 feet or less) to an external display when using applications such as word processors or spreadsheet applications, they may also prefer to be at a distance of 6 to 10 feet away for watching videos and/or movies on the same display. Accordingly, in a video usage mode, fewer graphical elements may be shown than in the applications usage mode. Furthermore, each graphical element may be rendered larger in the video usage mode, since the presumed viewing distance is greater than in the applications usage mode. As can be seen in FIG. 5, three graphical elements 511, 512, and 513, which are application icons, are shown, arranged in a single row.

Furthermore, a navigation control 521 can be rendered adjacent to the row of application icons to allow navigation through multiple rows of icons. When the navigation control 521 is invoked, application icons from an additional row (e.g., icons 414, 415, and 416 of FIG. 4), can be presented on the external display 402 in place of graphical elements 511, 512, and 513. Thus, as can be seen in FIG. 4 and FIG. 5, the applications usage mode (shown in FIG. 4) includes more rows of application icons that are rendered, while the video usage mode (shown in FIG. 5) includes fewer rows than when the device is in the applications usage mode, and the application icons are larger than the application icons in the applications usage mode. If the rendering of icons shown in FIG. 4 is viewed from 6-10 feet away, the icons are too small to be conveniently viewed. Thus, disclosed embodiments mitigate this problem by dynamically configuring the content presented for consumption via the external display based at least in part on a usage mode. While the examples shown in FIG. 4 and FIG. 5 show graphical elements that include application icons, other graphical elements can also be configured accordingly with disclosed embodiments. The graphical elements can include, but are not limited to, text strings, user interface elements (menus, checkboxes, buttons, etc.), video display windows, and so on. One or more embodiments can include arranging one or more graphical elements into a number of rows for displaying on the external display, the number of rows selected based on the display category of the external display.

Figure 6:
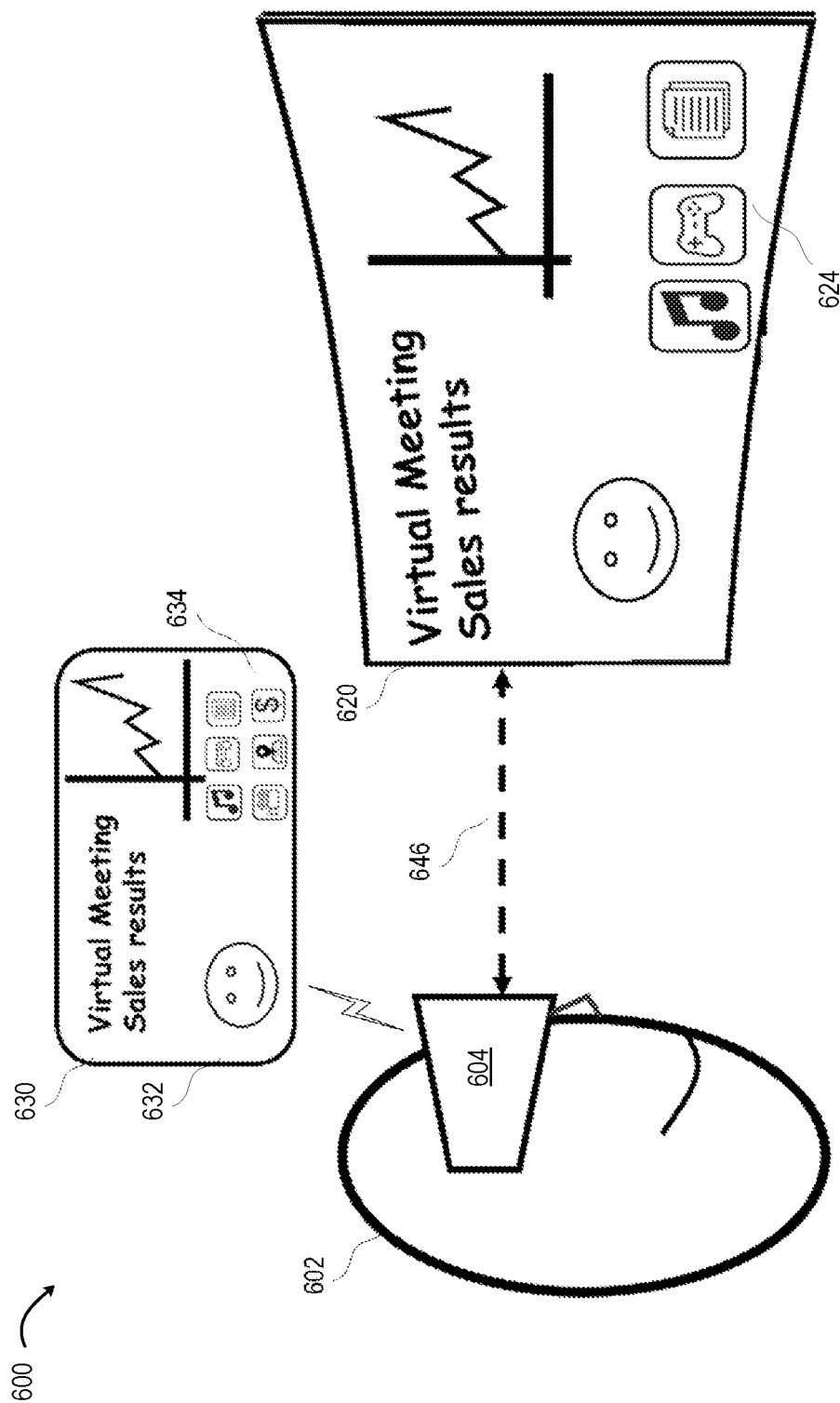
FIG. 6 illustrates an example of an external display that includes a virtual/augmented reality (VAR) device, according to one or more embodiments.

FIG. 6 illustrates an example 600 of an external display that includes a virtual/augmented reality (VAR) device, according to one or more embodiments. The term "VAR device" refers collectively to both Virtual Reality (VR) devices and Augmented Reality (AR) devices. Virtual Reality (VR) headsets are devices that immerse users in computer-generated virtual environments, allowing them to interact with and experience a digital world as if the digital world was real. VR headsets work by combining various technologies to create a convincing sense of presence and immersion. Augmented Reality (AR) glasses are another immersive device that has some similarities to VR headsets, but also some differences. While VR headsets are designed for fully immersing users in computer-generated virtual environments, AR glasses, on the other hand, are designed to overlay digital information and graphics onto the user's view of the real world. The real-world surroundings are not blocked; instead, digital content is integrated with the user's environment. AR is used for applications that enhance the real world with additional information, such as navigation, remote assistance, and information display. Thus, VR headsets use opaque screens (displays) that completely cover the user's field of view, blocking external visual stimuli. Users see only the virtual environment presented on the displays. In contrast, AR glasses typically use transparent displays (referred to as waveguides or optical see-through displays) that allow users to see both the real world and digital content simultaneously. The digital information is superimposed onto the real-world view. VAR devices can include high-resolution displays (one for each eye) positioned in front of the eyes of a user. The displays render stereoscopic 3D images, creating a 3D effect by presenting slightly different perspectives to each eye. Moreover, convex lenses are positioned between the user's eyes and the corresponding displays to focus the images and widen the field of view (FOV). The lenses contribute to the user-sensation of viewing a large screen, while in fact the actual display size is quite small, to fit inside the VAR device.

The issues of configuring content for display that are shown in FIG. 4 and FIG. 5 also can apply to VAR devices. In one or more embodiments, the VAR device provides a virtual display size that the electronic device can obtain via an API (application programming interface) call. Example 600 shows a user 602 wearing VAR device 604. In the example 600, an electronic device 630 is communicatively connected to VAR device 604 via a wireless or wired connection. Thus, in the example 600, the VAR device 604 is serving as an external display device for electronic device 630. Device 630 can be an implementation of electronic device 100, having similar components and/or functionality. The VAR device 604 renders a virtual display 620 that is rendered at a virtual distance 646 from user 602. That is, the virtual display 620 is rendered to appear to be the distance indicated by virtual distance 646 from the user 602. In one or more embodiments, the virtual distance 646 can range from 1 foot to 15 feet. Moreover, the size of the virtual display 620 can vary. As there are no physical limitations, the size of display 620 can have a wide range, from a small display of about 5 inches (diagonally measured) to 100 inches (diagonally measured) or more. Accordingly, issues regarding graphical elements such as icons, text, user interface elements, and/or other graphical elements that occur in a physical (real) environment can also occur in a virtual environment created by a VAR device.

Referring again to FIG. 6, the electronic device 630 includes a display 632 that renders content, including a group of graphical elements 634 arranged in two rows. The content that is rendered on display 632 of electronic device 630 is rendered on virtual display 620 via VAR device 604. However, based on the virtual distance 646 exceeding a predetermined threshold (e.g., 4 feet), the group of graphical elements 624 rendered on virtual display 620 are rendered differently than group of graphical elements 634. In particular, while group of graphical elements 634 includes two rows of small-sized application icons, the group of graphical elements 624 includes one row of large-sized icons, providing an improved user experience for the user 602 when utilizing a VAR device external display. In one or more embodiments, the external display includes a virtual/augmented reality (VAR) device. The processor of the device: obtains a virtual display distance parameter from the external display; and selects a specific subset of the one or more graphical elements to present on the virtual display 620 based at least in part on the obtained virtual display distance parameter.

Figure 7:
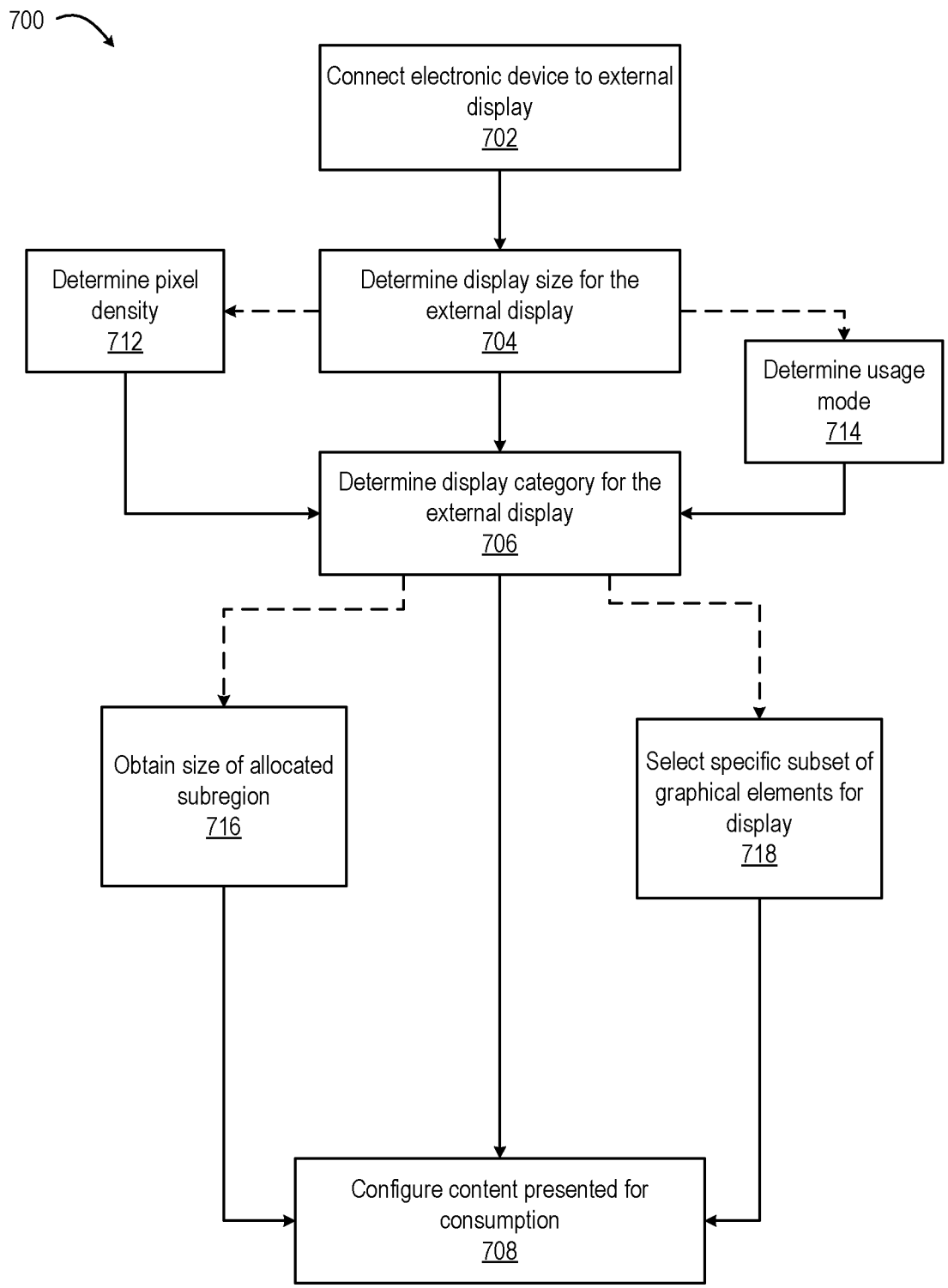
FIG. 7 depicts a flowchart of a method for determining various criteria used in configuring content presented for consumption on an external display, according to one or more embodiments.
Figure 8:
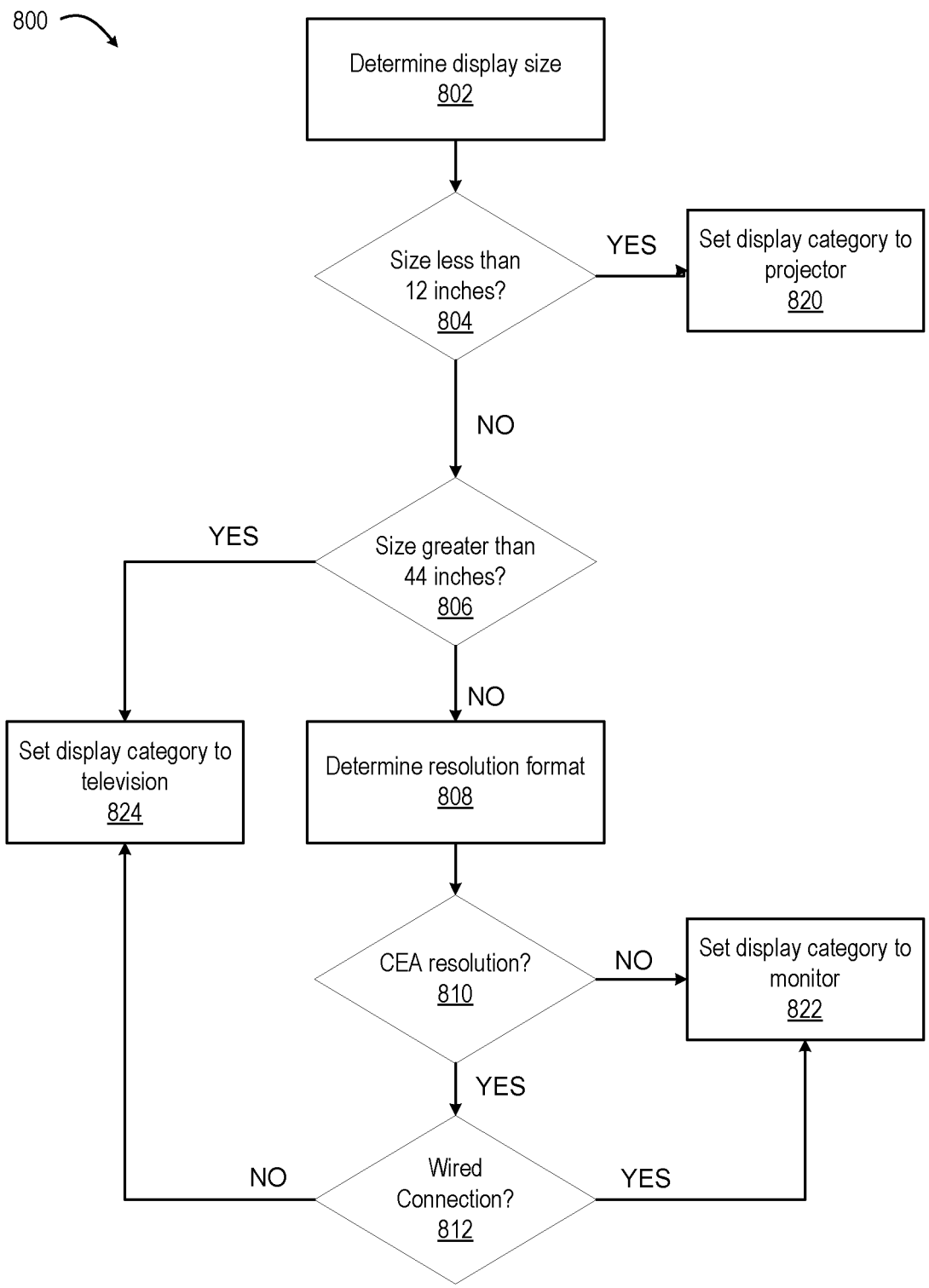
FIG. 8 depicts a flowchart of a method for determining a display category based on various criteria, according to one or more embodiments.

Referring now to the flowcharts presented by FIGS. 7-8, the descriptions of the methods in FIGS. 7-8 are provided with general reference to the specific components and features illustrated within the preceding FIGS. 1-6. Specific components referenced in the methods of FIGS. 7-8 may be identical or similar to components of the same name used in describing preceding FIGS. 1-6. In one or more embodiments, processor 102 (FIG. 1) configures electronic device 100 (FIG. 1) to provide the described functionality of the methods of FIGS. 7-8 by executing program code for one or more modules or applications provided within system memory 120 of electronic device 100, including external display module (EDM) 152 (FIG. 1).

FIG. 7 depicts a flowchart of a method 700 for determining various criteria used in configuring content presented for consumption on an external display, according to one or more embodiments. The method 700 starts at block 702, where an external display is wired or wirelessly connected to an electronic device, such as electronic device 100 of FIG. 1. The method 700 continues to block 704, where a display size is determined for the external display. In one or more embodiments, the determining of the display size can include obtaining and parsing EDID information. Optionally, the method 700 can include determining a pixel density for the external display at block 712. In one or more embodiments, the determining of a pixel density can be based on the size and resolution of the external display. The method 700 can optionally include determining a usage mode for an electronic device at block 714. In one or more embodiments, the usage mode can be determined by prompting a user with a user interface for usage mode determination as part of the external display connection process, such as shown in FIG. 2. The method 700 further includes determining a display category for the external display at block 706. In one or more embodiments, the display category can include one of projector, monitor, or television. The method 700 continues to configuring content that is presented for consumption on the external display at block 708, based on criteria including, but not limited to, display size, pixel density, usage mode of the electronic device, and/or size of an allocated subregion. The configuring can include selecting a set of graphical elements such as application icons, user interface elements (buttons, menus, etc.), font types and/or font sizes, and so on. In one or more embodiments, the configuring can include dynamic scaling of graphical elements. In one or more embodiments, the dynamic scaling of graphical elements can be accomplished with vector graphics. Vector graphics use mathematical equations to define shapes, lines, and colors, rather than fixed pixels. As a result, images created with vector graphics can be scaled up or down without loss of quality or detail. Vector graphics are resolution-independent, making them well-suited for dynamic scaling. In one or more embodiments, the electronic device includes libraries of vector-based icons and graphic elements. These libraries include multiple versions of each icon to accommodate different display sizes, pixel densities, and/or resolutions. Optionally, the method 700 can include obtaining a size of an allocated subregion of the external display, at block 716. An allocated subregion is a portion of the external display area that is allocated to displaying content from the connected electronic device, such as shown at 324 of FIG. 3. The method 700 can optionally include selecting a specific subset of graphical elements for display on the external display at block 718, based on criteria including, but not limited to, display size, pixel density, usage mode of the electronic device, and/or size of an allocated subregion. Examples of a specific subset being selected for display on the external display are shown in at least FIG. 5 and FIG. 6. In FIG. 5, the specific subset includes graphical elements 511, 512, and 513, which are part of a larger set of graphical elements shown in FIGS. 4 (411-416). In FIG. 6, the specific subset is shown at 624, in which graphical elements shown at 624 are part of a larger set of graphical elements shown at 634.

FIG. 8 depicts a flowchart of a method 800 for determining a display category based on various criteria, according to one or more embodiments. The method 800 starts with determining a display size at block 802. In one or more embodiments, the determining of the display size can include obtaining and parsing EDID information. The method 800 continues to block 804, where a check is made to determine if the size of the external display is less than 12 inches (diagonally measured). If, at block 804, the size is determined to be less than 12 inches, then the display category is set to a type 'projector' at block 820. If, at block 804, the size is determined to be greater than or equal to 12 inches, then the method 800 continues to block 806, where a check is made to determine if the size of the external display is greater than 44 inches (diagonally measured). If, at block 806, the size is determined to be greater than 44 inches, then the display category is set to a type 'television' at block 824. If, at block 806, the size is determined to be less than or equal to 44 inches, then the method 800 continues to block 808, where a resolution format is determined. In one or more embodiments, the determining of the resolution format can include obtaining and parsing EDID information. The method 800 continues to block 810, where a check is made to determine if the resolution type is CEA resolution.

The acronym CEA stands for the Consumer Electronics Association, which was an industry association that developed standards and guidelines for various consumer electronics products. In the context of display resolutions, "CEA resolution" typically refers to display resolutions and standards defined by the CEA. In one or more embodiments, the determination of resolution type includes determining if the resolution type is CEA-861. CEA-861 defines a set of common video formats and resolutions for digital television displays and consumer electronics devices. These formats include various High-Definition (HD) and Ultra High-Definition (UHD) resolutions, such as 720p, 1080i, 1080p, and 4K (2160p). The CEA standards provide a common framework for video formats, enabling compatibility between devices such as HDTVs, streaming sticks, gaming consoles, and set-top boxes.

An alternative standard that is prevalent in external displays is VESA (Video Electronics Standards Association). VESA is an industry organization that establishes and promotes standards for various aspects of display and video technologies. The VESA standards can include VGA (Video Graphics Array) standard. The VGA standard, introduced by IBM in the 1980s, defined a resolution of 640×480 pixels, with a refresh rate of 60 Hz. The VESA standards can include XGA (Extended Graphics Array) standard. XGA offers a resolution of 1024×768 pixels. XGA is commonly used for computer monitors and projectors. The VESA standards can include WXGA (Wide Extended Graphics Array) standard. WXGA is an extension of XGA and typically refers to a resolution of 1280×800 or 1366×768 pixels, which is often used in widescreen displays and laptops. The VESA standards can include Full HD (1080p) standard Full HD offers a resolution of 1920×1080 pixels, which has become a standard for HDTVs, computer monitors, and multimedia content. The VESA standards can include QHD (Quad High Definition): QHD provides a resolution of 2560×1440 pixels, offering higher pixel density and clarity for large computer monitors and some smartphones. The VESA standards can include 4K UHD (Ultra High Definition): 4K UHD refers to a resolution of 3840×2160 pixels and is commonly used in high-end computer monitors and 4K televisions. The VESA standards can include 8K UHD (Ultra High Definition): 8K UHD offers a resolution of 7680×4320 pixels, providing extremely high pixel density and clarity, primarily used in advanced displays. Other VESA resolutions are possible in disclosed embodiments. One or more embodiments can include: determining a resolution format for the external display, where the resolution format includes one of Consumer Electronics Association (CEA) and Video Electronics Standards Association (VESA); and determining the display category based at least in part on the resolution format.

If, at block 810, it is determined that the resolution format is not CEA resolution, then the method 800 continues to block 822, where the display category is set to a type 'monitor.' In one or more embodiments, if the resolution format is not CEA, the resolution format value defaults to VESA. If, at block 810, it is determined that the resolution format is CEA resolution, then the method 800 continues to block 812 where a check is made to determine if the connection between the electronic device that is providing content and the external display is a wired connection (E.g., HDMI, USB, or the like). If, at block 812, it is determined that the connection is a wired connection, then the method 800 continues to block 822, where the display category is set to a type 'monitor.' If, at block 812, it is determined that the connection is a not a wired connection, then the method 800 continues to block 824, where the display category is set to a type 'television.' Embodiments can include identifying a connection type and determining the display category based at least in part on the connection type.

The criterion of the wired connection referenced at block 812 is useful for devices that support a wired connection. For devices that do not include a wired connection, one or more embodiments can use the other criteria specified in blocks 804, 806, and/or 810 for determining the display category. As an example, a smartphone may use a wireless connection (e.g., via a Miracast dongle), and based on display information retrieved from the Miracast dongle, such as the display size of the external display connected to the Miracast dongle, the display category may be determined to be of type monitor. In one or more embodiments, when a wireless connection is in use, such as with a Miracast dongle, an external display size within a predetermined range is deemed to be a monitor. In one or more embodiments, the predetermined range is 12 inches to 44 inches, measured diagonally. In one or more embodiments, additional criteria can be used instead of, or in addition to, the external display size. The additional criteria can include a content source. As an example, a content source that includes a television broadcast channel can be used to determine the display category to be of type television. In cases where it is not possible to identify the external display (e.g., due to missing or incomplete EDID information), the content source can be used as a criterion in determination of the display category.

The logic described for method 800 and shown in FIG. 8 can accommodate typical user behavior. As an example, typically a display size exceeding 44 inches is more likely to be used as a television. For mid-size devices, the optimal configuration for graphical elements from a connected electronic device can depend on various criteria, such as display category, pixel density, resolution format, connection type, usage mode, and/or other criteria. In one or more embodiments, some of the steps shown in FIGS. 7-8 may be performed in a different order, performed concurrently, or omitted.

As can now be appreciated, disclosed embodiments provide an optimal viewing experience for connected display devices. The features of disclosed embodiments enable users to conveniently view content from a portable electronic device such as a smartphone on an external display. The content can include graphical elements. Disclosed embodiments configure the content presented on the external display based on various criteria to provide an optimal user experience that reduces the risk of wasted screen area from icons that are too large, or rendering icons and text that are too small. Accordingly, disclosed embodiments can automatically select an appropriate configuration for graphical elements that are mirrored onto an external display, taking into account additional information beyond the EDID data or other device-specific information.

In the above-described methods, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals, but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
a memory having a display configuration module stored thereon;
a communication subsystem that comprises an interface by which the electronic device communicatively connects to one or more external display devices;
a processor communicatively coupled to the memory and communication subsystem, and which executes program code of the display configuration module, wherein the processor is configured to cause the electronic device to:
connect, via the interface, to an external display;
determine a display size for the external display;
determines a usage mode for the external display;
determine a display category for the external display, based at least in part, on the display size and the usage mode;
configure, based on the display category, content presented for consumption via the external display, wherein to configure the content, the processor causes the electronic device to dynamically configure the content presented for consumption via the external display, based, at least in part on the usage mode, wherein at least one display characteristic of the content can be modified for optimal presentation on the external display;
in response to the usage mode being a video usage mode, present fewer graphical elements rendered larger within an allocated subregion for presenting the content; and
in response to the usage mode being an applications usage mode, present a larger number of graphical elements rendered smaller within the allocated subregion relative to the presentation in video usage mode.

2. The electronic device of claim 1, wherein:
to determine a display size for the external display, the processor retrieves Extended Display Identification (EDID) information from the external display;
in determining a display category for the external display, the processor further determines a pixel density for the external display; and
the processor selects, from among multiple different sets of graphical elements each set having different resolution value corresponding to different pixel densities, a first set of graphical elements based on the pixel density value of the external display.

3. The electronic device of claim 1, wherein: the usage mode comprises one of a gaming, a video, and an applications usage mode;
to determine the usage mode, the processor causes the electronic device to present a user mode selection interface on a display of the electronic device and receive a user selection of the usage mode; and
the processor further causes the electronic device to:
determine the display category based at least in part on the usage mode, which is utilized to configure a presentation of content on the external display.

4. The electronic device of claim 1, wherein further the processor:
selects a size and resolution of graphical elements to display on the external display, in part based on the usage mode;
determine a number of rows and/or columns of graphical elements to display on the external display;
arranges one or more graphical elements into the number of rows for displaying on the external display, the number of rows selected based on the display category of the external display and the usage mode.

5. The electronic device of claim 4, wherein each usage mode is associated with a distance of a user from the external display, and the processor:
selectively displays the graphical elements on the external display in a different configuration from a first display configuration on a first display of the electronic device based on the usage mode.

6. The electronic device of claim 4, wherein the content is presented on an allocated subregion of the external display and the processor:
obtains a size of the allocated subregion of the external display; and
selects a specific subset and configuration of the one or more graphical elements for presentation on the external display based at least in part on the obtained size of the allocated subregion and the display category as determined, at least in part, by the usage mode.

7. The electronic device of claim 6, wherein the processor causes the electronic device to:
in response to the usage mode not enabling presentation of all graphical elements from the content provided by the electronic device within the allocated subregion:
render at least one row presenting less graphical elements than a total number of graphical elements presented within the content; and
render a navigation control presented adjacent to the at least one row of less graphical elements to enable navigation through other rows of graphical elements.

8. The electronic device of claim 4, wherein the external display comprises a virtual display generated by an augmented reality (VAR) device, and wherein further the processor:
obtains a virtual display distance parameter from the virtual display; and
selects a specific subset and configuration of the one or more graphical elements for presentation on the VAR device based at least in part on the obtained virtual display distance parameter.

9. A method comprising:
connecting, by a processor of an electronic device, to an external display;
determining a display size for the external display;
determining a usage mode for the external display;
determining a display category for the external display, based at least in part, on the display size and the usage mode;
configuring, based on the display category, content presented for consumption via the external display, wherein to configure the content, the processor causes the electronic device to dynamically configure the content presented for consumption via the external display, based, at least in part on the usage mode, wherein at least one display characteristic of the content can be modified for optimal presentation on the external display;
in response to the usage mode being a video usage mode, presenting fewer graphical elements rendered larger within an allocated subregion for presenting the content; and
in response to the usage mode being an applications usage mode, presenting a larger number of graphical elements rendered smaller within the allocated subregion relative to the presentation in video usage mode.

10. The method of claim 9, further comprising:
determining a display size for the external display by retrieving Extended Display Identification (EDID) information from the external display;
determining a pixel density for the external display; and
selecting, from among multiple different sets of graphical elements each set having different resolution value corresponding to different pixel densities, a first set of graphical elements based on the pixel density value of the external display.

11. The method of claim 9, wherein:
the usage mode includes one of a gaming, a video, and an applications usage mode; and
determining the usage mode comprises presenting a user mode selection interface on a display of the electronic device and receiving a user selection of the usage mode; and
the method further comprises:
determining the display category based at least in part on the usage mode, which is utilized to configure a presentation of content on the external display.

12. The method of claim 9, further comprising:
selecting a size and resolution of graphical elements to display on the external display, in part based on the usage mode;
determining a number of rows and/or columns of graphical elements to display on the external display;
arranging one or more graphical elements into the number of rows for displaying on the external display, the number of rows selected based on the display category of the external display and the usage mode.

13. The method of claim 12, wherein the content is presented on an allocated subregion of the external display and further comprising:
obtaining a size of the allocated subregion of the external display; and
selecting a specific subset of the one or more graphical elements for presentation on the external display based at least in part on the obtained size of the allocated subregion and the display category as determined, at least in part, by the usage mode.

14. The method of claim 12, wherein the external display comprises a virtual display generated by an augmented reality (VAR) device, and further comprising:
obtaining a virtual display distance parameter from the virtual display; and
selecting a specific subset of the one or more graphical elements based at least in part on the obtained virtual display distance parameter.

15. The method of claim 12, further comprising:
in response to the usage mode not enabling presentation of all graphical elements from the content provided by the electronic device within the allocated subregion:
rendering and displaying at least one row presenting less graphical elements than a total number of graphical elements presented within the content; and
rendering and presenting a navigation control presented adjacent to the at least one row of less graphical elements to enable navigation through other rows of graphical elements.

16. A computer program product comprising a non-transitory computer readable medium having program instructions that when executed by a processor of an electronic device that is communicatively connected to an external display, configure the electronic device to perform functions comprising:
determining a display size for the external display;
determining a usage mode for the external display;
determining a display category for the external display, based at least in part, on the display size and the usage mode;
configuring, based on the display category, content presented for consumption via the external display, wherein to configure the content, the processor causes the electronic device to dynamically configure the content presented for consumption via the external display, based, at least in part on the usage mode, wherein at least one display characteristic of the content can be modified for optimal presentation on the external display;
in response to the usage mode being a video usage mode, presenting fewer graphical elements rendered larger within an allocated subregion for presenting the content; and
in response to the usage mode being an applications usage mode, presenting a larger number of graphical elements rendered smaller within the allocated subregion relative to the presentation in video usage mode.

17. The computer program product of claim 16, wherein the usage mode includes one of gaming, video, and applications and wherein the program instructions for determining a display category for the external display, further comprises program instructions for performing at least one of:
determining a pixel density for the external display and selecting, from among multiple different sets of graphical elements each set having different resolution value corresponding to different pixel densities, a first set of graphical elements based on the pixel density value of the external display;
determining the usage mode for the external display by presenting a user mode selection interface on a display of the electronic device and receiving a user selection of the usage mode; and
determining a resolution format for the external display, wherein the resolution format includes one of Consumer Electronics Association (CEA), and Video Electronics Standards Association (VESA) and in response to user selection of a gaming usage mode, selecting a higher refresh rate for the presentation of content on the external display; and
wherein the determining of the display category is based, at least in part, on one or more of the pixel density, the usage mode, the resolution format, and a connection type.

* * * * *